(12) United States Patent
Mori et al.

(10) Patent No.: US 8,542,453 B2
(45) Date of Patent: Sep. 24, 2013

(54) INSPECTION METHOD AND INSPECTION APPARATUS OF MAGNETIC DISK

(75) Inventors: Kyoichi Mori, Saitama (JP); Masanori Fukawa, Saitama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/345,763

(22) Filed: Jan. 9, 2012

(65) Prior Publication Data

US 2012/0176877 A1    Jul. 12, 2012

(30) Foreign Application Priority Data

Jan. 12, 2011    (JP) ................................ 2011-003566

(51) Int. Cl.
     *G11B 5/02*      (2006.01)

(52) U.S. Cl.
     USPC ................................ 360/25; 360/75; 324/212

(58) Field of Classification Search
     USPC .... 360/25, 31, 75; 324/210, 212; 369/53.41, 369/53.42
     See application file for complete search history.

(56) References Cited

U.S. PATENT DOCUMENTS

| | | | |
|---|---|---|---|
| 5,423,111 A * | 6/1995 | Mori ............................ | 29/90.01 |
| 7,770,438 B2 * | 8/2010 | Kiyono et al. .................. | 73/104 |
| 2002/0018508 A1 * | 2/2002 | Sundaram et al. ................. | 374/7 |
| 2008/0100286 A1 * | 5/2008 | Meder et al. .................... | 324/212 |
| 2008/0259480 A1 * | 10/2008 | Pham et al. ....................... | 360/25 |
| 2009/0213486 A1 * | 8/2009 | Takahashi ......................... | 360/75 |

FOREIGN PATENT DOCUMENTS

| | | | |
|---|---|---|---|
| JP | 06-162496 | | 6/1994 |
| JP | 08185616 A | * | 7/1996 |
| JP | 09259401 A | * | 10/1997 |
| JP | 2007004859 A | * | 1/2007 |
| JP | 2007018565 A | * | 1/2007 |

* cited by examiner

*Primary Examiner* — Thang Tran
(74) *Attorney, Agent, or Firm* — Jianq Chyun IP Office

(57) ABSTRACT

An inspection method and inspection apparatus of a magnetic disk are provided. A gliding test and a certification test are performed at the same time by simultaneously moving a head for the certification test and a head for the gliding test with a heat distortion utilization mechanism (a micro thermal actuator) along a recording surface of the magnetic disk during rotation at a predetermined revolving speed. A flying height of the head for the gliding test is determined according to a revolving speed of the disk. When the flying height of the head for gliding test is determined according to the revolving speed at the certification test, the head for the gliding test is adjusted to a desired height by adjusting a variation of the heat distortion utilization mechanism disposed on the head for the gliding test. The gliding and certification inspections can be performed at the same time.

8 Claims, 4 Drawing Sheets

INSPECTION METHOD AND INSPECTION APPARATUS OF MAGNETIC DISK

CROSS-REFERENCE TO RELATED APPLICATIONS

This application claims the priority benefit of Japan application serial no. 2011-003566, filed on Jan. 12, 2011. The entirety of the above-mentioned patent application is hereby incorporated by reference herein and made a part of this specification.

TECHNICAL FIELD

The present invention relates to an inspection method and an inspection apparatus of a magnetic disk for efficiently inspecting a high density recording magnetic disk, and particularly to an inspection method and an inspection apparatus of a magnetic disk capable of performing gliding inspection and certification inspection at the same time.

BACKGROUND

A magnetic disk, which is a recording medium for a hard disk device (HDD), is made of a circular plate, such as aluminium and glass serving, as a base, and is configured to coat a magnetic film on its surface and further to coat a protective film thereon. The surface of this protective film is preferably a smooth flat surface with the least unevenness, such as a projection, and is required to have a good recording performance for the magnetic film. Conventionally, the smoothness of the protective film is inspected by a gliding inspection device and the recording performance of the magnetic film is inspected by a certification inspection. An apparatus disclosed in JP H6-162496 is known as an inspection apparatus of a magnetic disk capable of efficiently performing gliding inspection and certification inspection.

The apparatus disclosed in JP H6-162496 includes two head moving mechanisms, wherein any heads to perform the burnishing or the gliding inspection and a head to perform the certification inspection are arranged perpendicularly to a head moving direction, and the movement of each head for head switching is not performed at the head moving mechanism side but is performed by moving the spindle side perpendicularly to the head moving direction.

The apparatus disclosed in JP H6-162496 can perform the moving mechanism for switching the head with a single spindle moving mechanism so that the mechanism part can be simplified and high accuracy head positioning can be achieved. In addition, it is not necessary to move the heads for switching the heads for the gliding inspection and the certification inspection so that horizontal blurring can be prevented and high speed and high accuracy inspection can be performed for the magnetic disk.

The gliding inspection uses a gliding head, which is assembled with a piezo vibration sensor and performs the inspection by detecting the vibration occurred at the head when a projection on the disk is touched. Relying on the fact that a flying height of the head depends on a revolving speed of the disk, the height of the projection to be detected is set by controlling the revolving speed of the disk. On the other hand, the certification inspection uses a head with recording and replaying capabilities and inspects by recording inspection signals on the disk during rotation at the predetermined revolving speed and replaying the recorded inspection signal. Accordingly, these two inspections cannot be performed at the same time because they have different conditions for the revolving speed. Therefore, with the present circumstances, the certification inspection is performed after the gliding inspection is performed on a single inspection spindle or the inspections are performed at the same time respectively on different spindles.

SUMMARY

A purpose of the present invention, based on the considerations of the above described problems, is directed to an inspection method and an inspection apparatus of a magnetic disk capable of performing a gliding inspection and a certification inspection respectively with different inspection conditions at the same time.

A first feature of the inspection method of the magnetic disk according to the present invention resides in that a gliding test and a certification test are performed at the same time by simultaneously moving a head for the certification test and a head for the gliding test with a heat distortion utilization mechanism along with a recording surface of the magnetic disk during rotation at the predetermined revolving speed. A flying height of the head for the gliding test is determined according to the revolving speed of the disk. Accordingly, in the present invention, when the flying height of the head for the gliding test is determined according to the revolving speed at the certification test, the head for the gliding test is adjusted to a desired height by adjusting a variation of the heat distortion utilization mechanism. Hereby, the gliding inspection and the certification inspection can be performed at the same time.

A second feature of the inspection method of the magnetic disk according to the present invention resides in that, in the inspection method of the magnetic disk as described in the first feature, the movement in a radial direction of the head for the gliding test precedes that of the head for the certification test in order to prevent the head for the gliding test and the head for the certification test from having the same radius and the certification test is interrupted when a projection of a bad disk is detected by the head for the gliding test. This means that the movement in the radial direction of the head for the gliding test precedes that of the head for the certification test in order to prevent both heads from having the same radius, that is, by tracing different tracks respectively on both heads, the certification test is interrupted when the projection of the bad disk is detected first by the head for the gliding test. Hereby, since the head for the gliding test can first detect the projection of the bad disk, the head for the certification test performs the inspection without being damaged due to the projection of the bad disk.

A third feature of the inspection method of the magnetic disk according to the present invention resides in that, in the inspection method of the magnetic disk as described in the first or the second feature, the heat distortion utilization mechanism comprises a micro thermal actuator, and the gliding test is performed by adjusting the distance (flying height) between the head for the gliding test and the recording surface of the magnetic disk according to an applied power supplied to this micro thermal actuator. This means that the heat distortion utilization mechanism is a micro thermal actuator, and the variation is adjusted and the flying height is adjusted by adjusting the applied power supplied to this micro thermal actuator.

A first feature of the inspection apparatus of the magnetic disk according to the present invention resides in that a spindle means to rotate the magnetic disk with mounting condition, a first head moving means to move the head for the gliding test with the heat distortion utilization mechanism along with the recording surface of the magnetic disk mounted on the spindle, a second head moving means to move the head for the certification test with the heat distortion utilization mechanism along with the recording surface of the magnetic disk mounted on the spindle and a control means to simultaneously move the head for the gliding test and the head for the certification test along with the recording surface of the magnetic disk by the first and the second moving means and to control the gliding test and the certification test to perform at the same time are included. This exemplary embodiment of the invention of the inspection apparatus of the magnetic disk corresponds to the first feature of the inspection method of the magnetic disk.

A second feature of the inspection apparatus of the magnetic disk according to the present invention resides in that, in the inspection apparatus of the magnetic disk as described in the first feature, the movement in the radial direction of the head for the gliding test precedes that of the head for the certification test by the control means in order to prevent the head for the gliding test and the head for the certification test from having the same radius and the certification test is interrupted when a projection of a bad disk is detected by the head for the gliding test. This exemplary embodiment of the invention of the inspection apparatus of the magnetic disk corresponds to the second feature of the inspection method of the magnetic disk.

A third feature of the inspection apparatus of the magnetic disk according to the present invention resides in that, in the inspection apparatus of the magnetic disk as described in the first or the second feature, the heat distortion utilization mechanism comprises a micro thermal actuator and the gliding test is performed by adjusting the distance (flying height) between the head for the gliding test and the recording surface of the magnetic disk according to the applied power supplied to this micro thermal actuator. This exemplary embodiment of the invention of the inspection apparatus of the magnetic disk corresponds to the third feature of the inspection method of the magnetic disk.

Accordingly, the present invention has an effect capable of performing the gliding inspection and the certification inspection with different inspection conditions at the same time. Hereby, the size of the inspection apparatus can be reduced and the throughput can be considerably improved.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
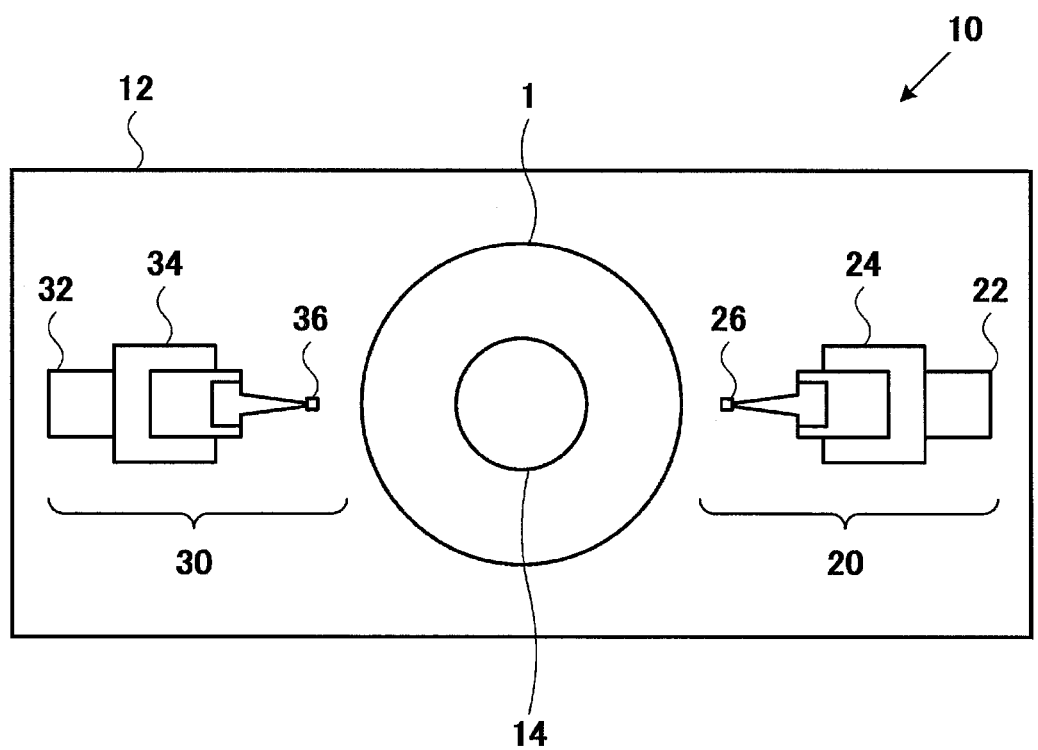
FIG. 1 is a top view of a head loading mechanism, viewed from the upside, which is a schematic configuration of an inspection apparatus of a magnetic disk according to an embodiment of the invention.
Figure 2:
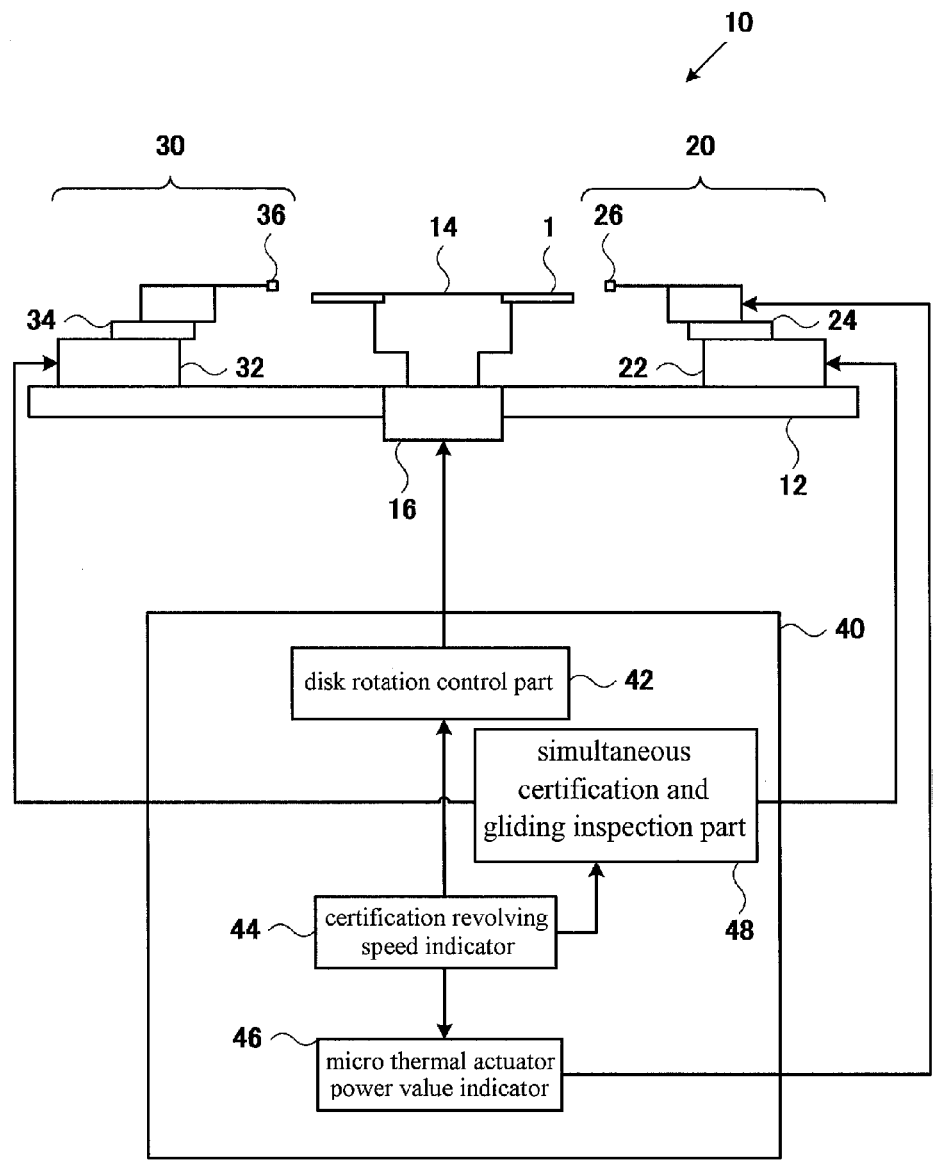
FIG. 2 is a schematic diagram illustrating the side view of FIG. 1 and a control system.

FIG. 1 is a top view of a head loading mechanism, viewed from the upside, which is a schematic configuration of an inspection apparatus of a magnetic disk according to an embodiment of the invention. FIG. 2 is a schematic diagram illustrating the side view of FIG. 1 and a control system. Referring to FIG. 1, an inspection apparatus of a magnetic disk 10 comprises a base 12, a spindle 14, a drive motor 16, a gliding inspection part 20, a certification inspection part 30 and a control device 40.

The base 12 is nearly rectangular, the drive motor 16 is disposed in its central part and the gliding inspection part 20 and the certification inspection part 30 are disposed on both sides. The spindle 14 is coupled to a revolving shaft of the drive motor 16. The control device 40 is disposed under the drive motor 16 and the drive motor 16 is driven and controlled corresponding to a control signal from the control device 40. The spindle 14 is coupled to the upside of the drive motor 16 and its bottom periphery is fixed to the base 12. A zipper is located on the upside of the spindle 14 to engage to the inside diameter of a hole disposed in the center of the magnetic disk 1 that is to be inspected. Since this zipper is not directly related to the present invention, a detailed description thereof is omitted.

The gliding inspection part 20 comprises a carriage 22, a slide 24 and a gliding head 26. The certification inspection part 30 comprises a carriage 32, a slide 34 and a certification head 36. The carriage 22 of the gliding inspection part 20 and the carriage 32 of the certification inspection part are disposed on both sides of the spindle 14 in approximately point symmetry to a rotation center of the spindle 14 and are fixed to the top surface of the base 12. The carriage 22 of the gliding inspection part 20 slides and moves the gliding head 26 and the carriage 32 of the certification inspection part 30 slides and moves the certification head 36 in a crosswise direction (X direction) as shown in the figures. Herein, in the figures, the inner structure of the carriage 22, 32 are not directly related to the present invention and are omitted from these figures. However, the inner part includes an actuator, such as a voice coil motor, and is configured to drive the slides 24, 34 by the actuator.

In the present embodiment, in order to perform the gliding inspection and the certification inspection at the same time, a mechanism carried on the gliding head 26 is used, wherein the mechanism is a positive pressure type test head and displaces an element in a record-and-replay part to the magnetic disk 1 side by using thermal expansion of the micro thermal actuator, etc.

The control device 40 comprises a disk rotation control part 42, a certification revolving speed indicator 44, a micro thermal actuator power value indicator 46 and a simultaneous certification and gliding inspection part 48. The certification revolving speed indicator 44 outputs the revolving speed during the certification test of the magnetic disk 1, which is set on the spindle 14, respectively to the disk rotation control part 42, the micro thermal actuator power value indicator 46 and the simultaneous certification and gliding inspection part 48. The disk rotation control part 42 controls the revolving speed of the spindle 14 in order to have the revolving speed during the certification test from the certification revolving speed indicator 44. The simultaneous certification and gliding inspection part 48 controls the drive of carriage 32, 34 at the point of time when the revolving speed of the spindle 14 reaches the desired revolving speed and executes the certification test and the gliding test. That is, the simultaneous certification-and-gliding inspection part 48 outputs a control signal to the carriage 32, 34, executes the certification test and the gliding test by moving the gliding head 26 and the certification head 36 to the magnetic disk 1 corresponding to the control signal, retreats each head from the magnetic disk 1 when the test finishes, and completes the inspection.

Since the micro thermal actuator is carried on the gliding head 26 according to the present embodiment, the micro thermal actuator power value indicator 46 controls the value of the applied power to the micro thermal actuator, which is carried on the gliding head 26, according to the revolving speed at the certification test from the certification revolving speed indicator 44. That is, the micro thermal actuator can adjust the surface shape variation, i.e. the flying height to the surface of the magnetic disk 1 in the record-and-replay part of the gliding head 26, corresponding to the magnitude of the applied power value. As the applied power supplied from the micro thermal actuator power value indicator 46 to the micro thermal actuator increases, correspondingly the surface shape variation (excrescence quantity) of the gliding head 26 is increased and accordingly the space between the surface of the magnetic disk 1 and the gliding head 25 becomes narrow. On the other hand, as the applied power supplied from the micro thermal actuator power value indicator 46 to the micro thermal actuator decreases, correspondingly the surface shape variation (excrescence quantity) of the gliding head 26 is decreased and accordingly the space between the surface of the magnetic disk 1 and the gliding head 25 becomes wide.

The operation of this inspection apparatus of the magnetic disk is described below. Assuming that the rotation center of the spindle 14 is on the point O1 (the first position). Corresponding to the control signal from the simultaneous certification-and-gliding inspection part 48, the gliding head 26 and the certification head 36 together with each carriages 32, 34 are moved in the radial direction of the magnetic disk 1 on X direction (crosswise direction in FIG. 2) along with its surface respectively. The gliding head 26 and the certification head 36 trace the same (or different) track and perform the gliding test and the certification test at the same time. The carriages 32, 34 are simultaneously controlled by the simultaneous certification-and-gliding inspection part 48 and the gliding test and the certification test can be performed in the whole area of the magnetic disk 1 by moving the gliding head 26 and the certification head 36 in the radial direction of and along the surface of the magnetic disk 1. Hereby, comparing with performing the gliding test and the certification test individually, the inspection time can be reduced to approximately half. In addition, the movement in the radial direction of the gliding head 26 precedes that of the certification head 36 in order to prevent both heads from having the same radius, that is by tracing different tracks respectively on both heads, the certification test is interrupted when the projection of the bad disk is detected first by the gliding head 26, and as a result, the certification head performs the inspection without being damaged due to the projection of the bad disk.

Generally, when the certification test is performed, it is necessary to perform the test at a revolving speed of the magnetic disk 1, which is a magnetic recording medium. Alternatively speaking, the test is performed by setting the revolving speed of the spindle 14 in a range of about 5,000~6,000 [rpm]. The revolving speed at the certification test depends on the revolving speed when the magnetic recording medium is actually used. Currently, there are also high speed hard disks, such as 15,000~20,000 [rpm]. In this case, it is necessary to perform the certification test at the revolving speed when it is actually used.

On the other hand, the flying height of the gliding head 26 at the gliding test is determined by various factors. That is, the flying height is mainly determined by a velocity of the air flow and a fly rail width or a weight of the slider. Since the fly rail width and the weight of the slider are decided by the gliding head, the flying height is determined by the revolving speed of the magnetic disk 1 and the linear velocity, which is determined by the position of the gliding head 26 on the magnetic disk 1. Therefore, by changing the revolving speed of the magnetic disk and fixing the linear velocity within a plane of the magnetic disk 1, the gliding head 26 can be flown with a certain flying height on the magnetic disk 1. That is, when the gliding test is performed, the revolving speed of the magnetic disk 1 (which is a magnetic recording medium), i.e. the revolving speed of the spindle 14, is an important factor to determine the flying height of the gliding head 26. Therefore, in the present embodiment, a positive pressure type is used on the gliding head 26. In addition, the revolving speed of the magnetic disk 1, (which is a magnetic recording medium), i.e. the revolving speed of the spindle 14, should be determined depending on how much the flying height of the gliding head 26 is. In the present embodiment, by adjusting the applied power value to supply to the micro thermal actuator carried on the gliding head 26, the surface shape of the gliding head 26, i.e. the flying height from the surface of the magnetic disk 1 of the gliding head 26, is displaced so that the revolving speed of the spindle 14 and the flying height of the gliding head can be voluntarily adjusted.

Figure 3:
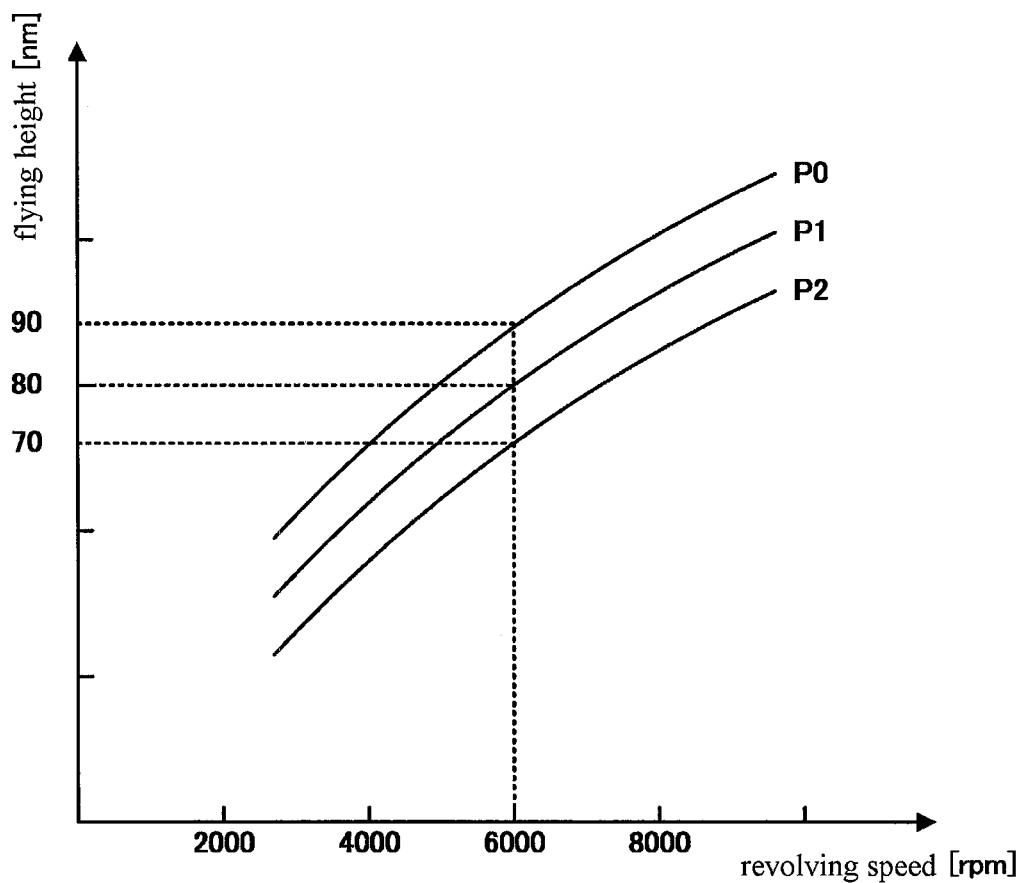
FIG. 3 is a characteristic diagram illustrating a relationship between a revolving speed of a magnetic disk and a flying height of a gliding head in an inspection apparatus of a magnetic disk using an applied power of a micro thermal actuator as a parameter.

FIG. 3 is a characteristic diagram illustrating a relationship between a revolving speed of a magnetic disk and a flying height of a gliding head in an inspection apparatus of a magnetic disk using an applied power of a micro thermal actuator as a parameter. In the figure, the horizontal axis is a revolving speed [rpm] of the magnetic disk 1, i.e. the spindle 14, the vertical axis is a flying height [μm] from the magnetic disk surface of the gliding head 26. The curve P0 shows a flying height when the applied power is not supplied to the micro thermal actuator, the curve P2 shows a flying height when the maximum applied power is supplied to the micro thermal actuator and the curve P1 shows a flying height when the half maximum applied power is supplied to the micro thermal actuator respectively. As shown in FIG. 3, by appropriately adjusting the applied power to the micro thermal actuator, the flying height of the gliding head 26 can be adjusted.

Figure 4:
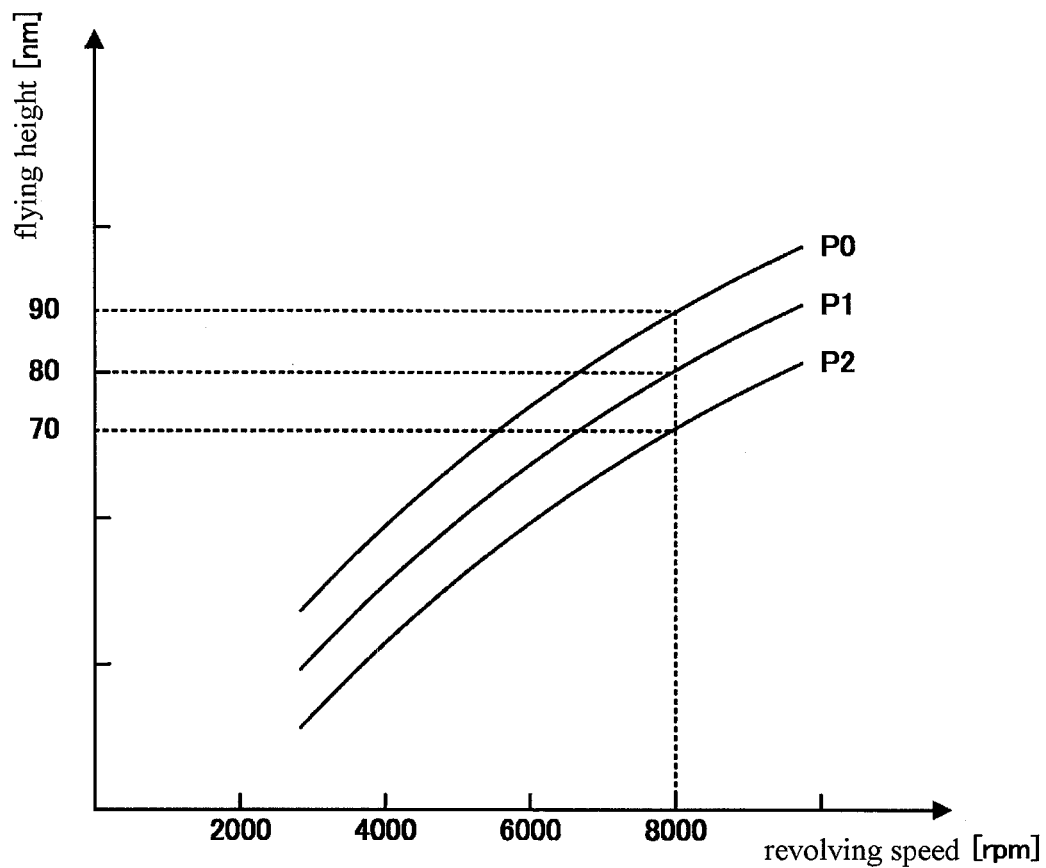
FIG. 4 is another characteristic diagram illustrating a relationship between a revolving speed of a magnetic disk and a flying height of a gliding head in an inspection apparatus of a magnetic disk using an applied power of a micro thermal actuator as a parameter.

FIG. 4 is another characteristic diagram illustrating a relationship between a revolving speed of a magnetic disk and a flying height of a gliding head in an inspection apparatus of a magnetic disk using an applied power of a micro thermal actuator as a parameter. Comparing with the characteristic diagram in FIG. 3, the flying height corresponding to the revolving speed of the spindle 14 in FIG. 4 is generally smaller.

For example, when the revolving speed of the spindle 14 at the certification inspection is 6,000 [rpm] and the gliding inspection test is desired to perform around 80 [nm], the gliding head 26 with a micro thermal actuator indicating a characteristic as shown in FIG. 3 is used. On the other hand, when the revolving speed of the spindle 14 at the certification inspection is 8,000 [rpm] and the gliding inspection test is desired to perform around 80 [nm], the gliding head 26 with a micro thermal actuator indicating a characteristic as shown in FIG. 4 is used. In this manner, the gliding head 26 indicating a desired characteristic is appropriately selected according to a relationship between the revolving speed at the certification inspection test and the flying height at the gliding inspection test. The characteristics in FIG. 3 and FIG. 4 are only examples, obviously there are also other various characteristics. The one that is suitable for the certification inspection and the gliding inspection should be selected according to their characteristics.

Herein, the above described embodiment showed a case when the gliding head 26 is one, however, preferably a plurality of gliding heads with a micro thermal actuator indicating the different characteristics as shown in FIG. 3 and FIG. 4 are disposed and a gliding head indicating the best characteristic is selected according to the revolving speed at the certification test and the flying height of the gliding test.

The present invention is not limited to a mechanism using thermal deformation (micro thermal actuator, thermal flying height control or DFC: dynamic flying control), and may have a mechanism capable of generating deformation to the outer surface of the fly surface.

It will be apparent to those skilled in the art that various modifications and variations can be made to the structure of the disclosed embodiments without departing from the scope or spirit of the disclosure. In view of the foregoing, it is intended that the disclosure of cover modifications and variations of this disclosure provided fall within the scope of the following claims and their equivalents.

What is claimed is:

1. An inspection method of a magnetic disk, performing a gliding test and a certification test at the same time by simultaneously moving a head for the certification test and a head for the gliding test with a heat distortion utilization mechanism along a recording surface of the magnetic disk during a rotation of the magnetic disk at a predetermined revolving speed, wherein the heat distortion utilization mechanism to adjust a distance between the head for the gliding test and the recording surface of the magnetic disk according to an applied power.

2. The inspection method of the magnetic disk as claimed in claim 1,
wherein a movement in a radial direction of the head for the gliding test precedes the head for the certification test in order to prevent the head for the gliding test and the head for the certification test from having a same radius and the certification test is interrupted when a projection of a bad disk is detected by the head for the gliding test.

3. The inspection method of the magnetic disk as claimed in claim 1,
wherein the heat distortion utilization mechanism comprises a micro thermal actuator and the gliding test is performed by adjusting the distance which is a flying height between the head for the gliding test and the recording surface of the magnetic disk, wherein the applied power supplied to the micro thermal actuator.

4. The inspection method of the magnetic disk as claimed in claim 2,
wherein the heat distortion utilization mechanism comprises a micro thermal actuator and the gliding test is performed by adjusting the distance which is a flying height between the head for the gliding test and the recording surface of the magnetic disk, wherein the applied power supplied to the micro thermal actuator.

5. An inspection apparatus of a magnetic disk, comprising:
a spindle means to rotate the magnetic disk in a mounting condition;
a first head moving means to move a head for a gliding test with a heat distortion utilization mechanism along a recording surface of the magnetic disk mounted on the spindle;
a second head moving means to move a head for a certification test along the recording surface of the magnetic disk mounted on the spindle; and
a control means to simultaneously move the head for the gliding test and the head for the certification test along the recording surface of the magnetic disk by the first and the second head moving means, and to control the gliding test and the certification test to perform at the same time,
wherein the heat distortion utilization mechanism to adjust a distance between the head for the gliding test and the recording surface of the magnetic disk according to an applied power.

6. The inspection apparatus of the magnetic disk as claimed in claim 5,
wherein a movement in a radial direction of the head for the gliding test precedes the head for the certification test by the control means in order to prevent the head for the gliding test and the head for the certification test from having a same radius and the certification test is interrupted when a projection of a bad disk is detected by the head for the gliding test.

7. The inspection apparatus of the magnetic disk as claimed in claim 5,
wherein the heat distortion utilization mechanism comprises a micro thermal actuator and the gliding test is performed by adjusting the distance which is a flying height between the head for the gliding test and the recording surface of the magnetic disk, wherein the applied power supplied to the micro thermal actuator.

8. The inspection apparatus of the magnetic disk as claimed in claim 6,
wherein the heat distortion utilization mechanism comprises a micro thermal actuator and the gliding test is performed by adjusting the distance which is a flying height between the head for the gliding test and the recording surface of the magnetic disk, wherein the applied power supplied to the micro thermal actuator.

* * * * *